June 23, 1942.　　　R. SARDESON　　　2,287,330
FOOD COOKING DEVICE
Filed Aug. 27, 1938　　　4 Sheets-Sheet 2

Inventor
Robert Sardeson
By Caswell & Lagaard
Attorneys

Inventor
Robert Sardeson

Patented June 23, 1942

2,287,330

UNITED STATES PATENT OFFICE 2,287,330

FOOD COOKING DEVICE

Robert Sardeson, Minneapolis, Minn., assignor to Harold C. Genter, Miami Beach, Fla.

Application August 27, 1938, Serial No. 227,131

21 Claims. (Cl. 161—16)

My invention relates to food cooking devices and particularly to operating mechanisms therefor and has for an object to provide a device which will be positive in action and which will repeatedly produce accurate and identical results.

Another object of the invention resides in providing an operating device which will produce exactly the same results regardless of the temperature of the cooking apparatus or the operating mechanism.

Another object of the invention resides in providing an operating mechanism which operates independently of thermostats and other heat controlled devices and in which compensation for variation in the temperature of the apparatus is positively procured.

A still further object of the invention resides in providing an operating mechanism which is controlled by mechanical devices instead of thermal devices.

Another object of the invention resides in providing an operating mechanism which is controlled solely through time controlled devices.

An object of the invention resides in providing an operating mechanism using a single time controlled movable member which, throughout a portion of the movement thereof, is utilized to control a time measuring device and which, throughout another portion of the movement thereof following the termination of the period measured by said time measuring device, serves to determine the duration of the next following period of time to be measured by said time measuring device.

Other objects of the invention reside in the novel combination and arrangement of parts and in the details of construction hereinafter illustrated and/or described.

While my invention may be used in various food cooking devices, I have, for the sake of illustration, disclosed the invention as embodied in a bread toaster.

Figures 1, 2:
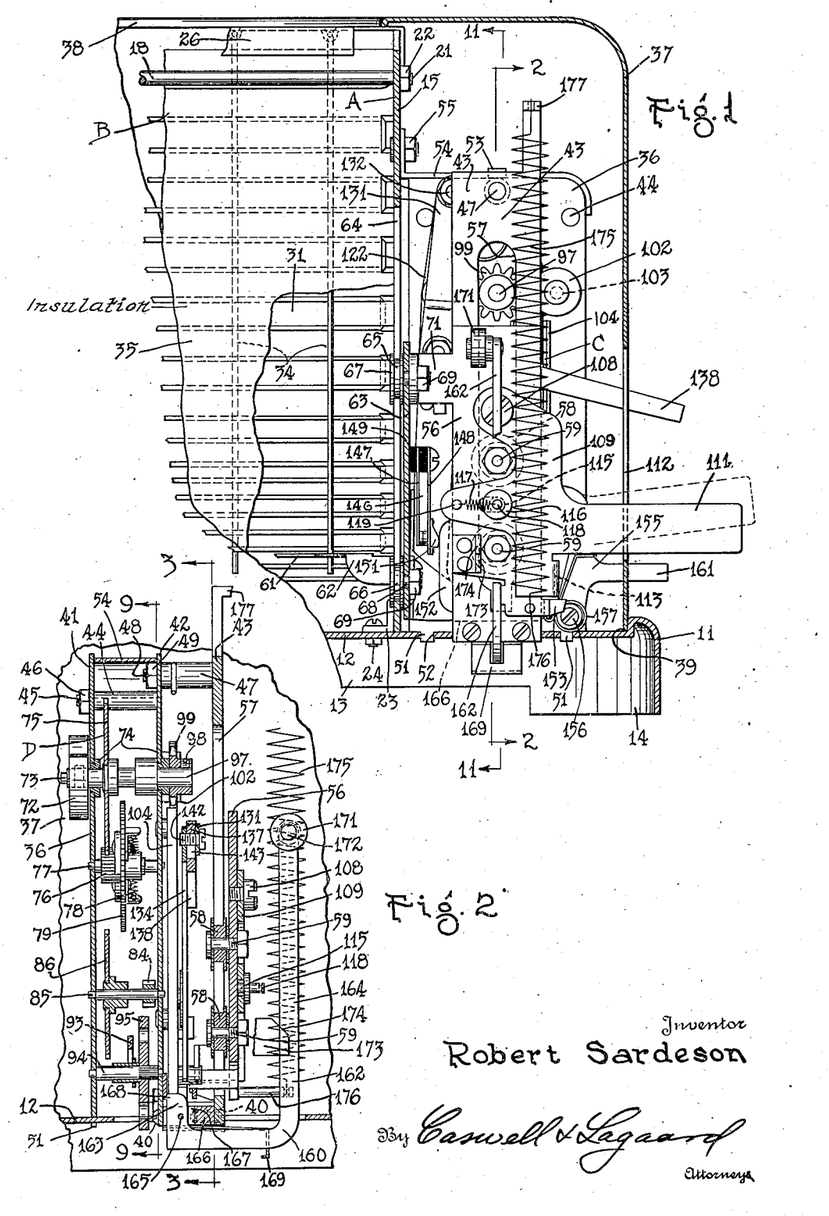
Fig. 1 is an elevational sectional view of a portion of a toaster illustrating an embodiment of my invention.
Fig. 2 is an elevational sectional view taken on line 2—2 of Fig. 1.
Figures 3, 11:
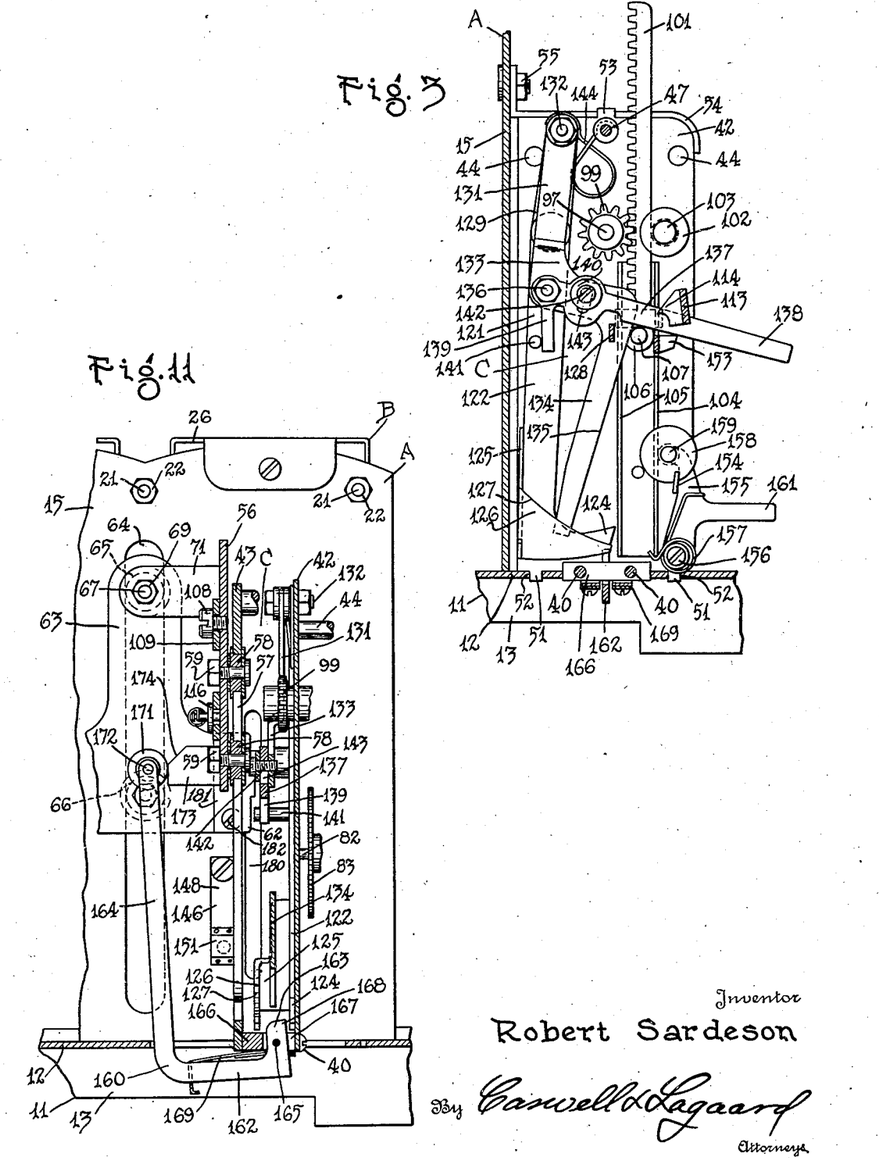
Fig. 3 is an elevational sectional view taken on line 3—3 of Fig. 2 and showing the parts in normal run down position.
Fig. 11 is a fragmentary elevational view taken on the line 11—11 of Figure 1.

My invention comprises a frame A which is best shown in Figs. 1 and 11. This frame carries, at one portion of the same, a toaster B and at another portion of the same a timing mechanism C for timing the operation of the toaster. At the locality of said timing mechanism is provided a clock work D for operating the timing mechanism. These various parts will now be described in detail.

The frame A comprises a base 11 which may be constructed from sheet metal as a stamping and which has a body portion 12 provided with a flange 13 depending therefrom. At the corners of the base 11 the flange 13 projects downwardly to form feet 14 by means of which the base is supported. Frame A further includes two vertically spaced plates, one of which has been shown and which is designated by the reference numeral 15. These two plates are rigidly attached to one another by means of shouldered rods 18. These rods are formed with threaded reduced shanks 21 which pass through the said plates and which have screwed upon the ends of them nuts 22. By means of this construction the respective plates are held in proper position and are attached to one another. The assembly of the plates thus formed is secured to the body 12 of base 11 by means of clip angles 23 which are secured to the said plates and bolted to the base 11 by means of bolts 24.

The toaster B may be of any suitable construction and for this reason the same has not been shown in detail. This toaster utilizes a number of supporting bars 26 which extend across and are attached to the plates 15. These bars are spaced apart to form the toasting ovens one of which has been shown in the drawings and indicated by the reference numeral 31. The bars 26 support, at spaced intervals, guard wires 34 which define the space in the bread oven in which the bread to be toasted is disposed. Beneath the bars 26 are situated the various heating elements 35 which heat the oven 31. These heating elements may be supported on the body 12 of base 11 in any suitable manner and likewise are supported at their upper ends through the bars 26. A case 37 encloses the entire toaster and is constructed with suitable openings 38 in the upper portion of the same through which the bread may be inserted into the toast ovens 31. The case 37 is received within a recess 39 in the base 11 and is attached thereto in any suitable manner.

The timing device C utilizes a frame 36 which is best shown in Figs. 1 and 2. Frame 36 includes three plates 41, 42 and 43. The two plates 41 and 42 are held in spaced relation by means of a number of rods 44 which are constructed at one end with shoulders riveted to the plate 42. At their other end these rods have reduced portions 45 which are threaded to receive nuts 46. These nuts serve to attach the plate 41 to the rods and to hold the two plates in spaced relation. The plate 43 is somewhat thicker than the plates 41 and 42 for a purpose to be presently more fully described and is held attached to the plate 42 at its upper end by means of a number of rods 47. Rods 47 are constructed in identically the same manner as the rods 44 and are formed with reduced ends 48, threaded to receive nuts 49, by means of which the said rods are held attached to the plate 42. The plate 43 has attached to the lower end thereof by means of screws 40 a bar 166 which is in like manner secured to plate 42. This bar serves a purpose to be later described in detail. Frame 36 is mounted on the frame A in the following manner. The two plates 41 and 42 are constructed at their lower ends with ears 51 which extend through slots 52 in the body 12 of base 11. The upper ends of these plates are similarly constructed with ears 53 which extend into similar notches in a bracket 54 secured to the plate 15 by means of a bolt 55.

The toaster B includes a bread carriage 56 which is slidably mounted for vertical movement along the plate 43. For this purpose the plate is constructed heavier than the plates 41 and 42 and is formed with a vertically extending slot 57. Traveling along this slot are two rollers 58 which are mounted on pintles 59 secured to the carriage 56 and best shown in Fig. 2. The rollers 58 are of such dimensions as to be snugly received in the slot 57 and guide the carriage 56 for vertical translatory movement.

The heating elements 35 may be energized from any suitable source of electric current which is controlled by means of a switch 146. This switch includes two switch leaves 147 and 148 which are attached to a suitable insulated support 149. The switch leaf 148 has secured to it a cam 151 which is adapted to be engaged by a projection 152 on the carriage 56. The projection 152 is so designed that, when the carriage 56 is latched in its lowermost position, switch 146 is closed, and when the carriage is released the switch becomes open.

The bread carried in the toaster B is supported on one or more bread racks, there being one bread rack for each toasting oven. In the drawings only one such bread rack has been shown which is indicated by the reference numeral 61. This bread rack extends horizontally throughout the toasting oven 31 and is provided with suitable holes, not shown, through which the lower ends of the guard wires 34 extend.

The bread rack 61 is provided with a bracket 62 which extends through a slot 180 in the end plate 15. This bracket has an ear 181 shown in Fig. 11 which is rigidly secured to a vertically extending supporting bar 63 by means of screws 182. Bar 63 is mounted for vertical translatory movement similar to the bread carriage 56 and in much the same manner. In the plate 15 is formed another vertically extending slot 64, which has slidably mounted in it two rollers 65 and 66. These rollers rotate upon pintles 67 and 68 which are attached to the bar 63. These pintles are threaded at their ends to receive nuts 69 by means of which the pintles may be attached to the bar 63. The bread carriage 56 is constructed with a bracket 71 which is clamped under the nut 69 of the pintle 67 whereby the bar 63 and the bread carriage 56 travel in unison. The bracket 62 of bread rack 61 is rigidly attached to the bar 63 so that movement of the carriage 56 causes corresponding movement of the bread rack 61. The bread carriage 56 and the bread racks 61 are normally urged upwardly by means of a tension coil spring 175. This spring is anchored at one end on a pin 176 secured to carriage 56 and at its other end to a bracket 177 formed on plate 43.

Figure 9:
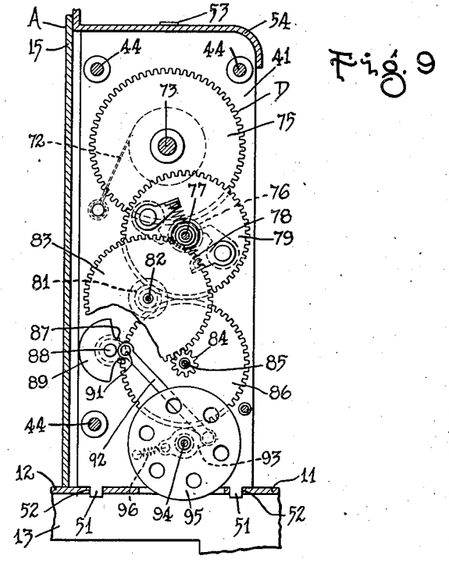
Fig. 9 is an elevational sectional view taken on line 9—9 of Fig. 2.
Figure 10:
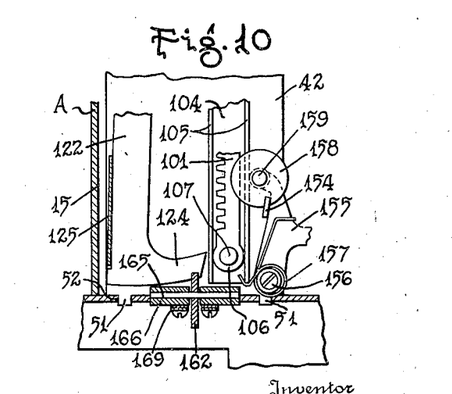
Fig. 10 is a fragmentary elevational view showing the cam locking device.

The clock work D is best shown in Figs. 2 and 9. For the purpose of energizing the clock work, a spiral spring 72 is utilized which is anchored at one end to the plate 41 and at its other end to an arbor 73. Arbor 73 is journaled for rotation in bushings 74 set into the plates 41 and 42. This arbor carries a spur gear 75 which meshes with a spur pinion 76 fast on another arbor 77. Arbor 77 is mounted for rotation in bearings drilled in the two plates 41 and 42. A ratchet mechanism 78 acts between the arbor 77 and a spur gear 79 rotatably mounted on said arbor, which mechanism permits of rotating the arbor 73 to wind the spring 72 and at the same time effects a drive for the gear 79. Inasmuch as such ratchet mechanisms are well known in the art, the construction thereof has not been shown in detail.

Gear 79 meshes with a spur pinion 81 fast on an arbor 82 journaled in bearings drilled in the two plates 41 and 42. This arbor carries a spur gear 83 which meshes with a spur pinion 84 fast on another arbor 85 likewise journaled in bearings drilled in the plates 41 and 42. Arbor 85 carries a spur gear 86 which meshes with a spur pinion 87 rotatably mounted on a stud 88 secured to plate 41. The gear 87 has secured to it a counter-weighted crank arm 89 which has secured to it a crank pin 91. Pivoted on the crank pin 91 is a link 92 which is also pivoted to a lever 93 which is rotatably mounted on an arbor 94. Arbor 94, similar to the other arbors, is journaled for rotation in bearings drilled in two plates 41 and 42. Arbor 94 has secured to it a balance wheel 95. A spring 96 forms a driving connection between the lever 93 and the balance wheel 95 whereby movement of the link 92, through rotation of arbor 88, imparts oscillatory movement to the balance wheel 95 and arbor 94. The spring 96 absorbs the shock created by the link 92 and causes the device to operate more quietly. It will thus be seen that the crank 89, link 92 and the structure operated thereby serves as an escapement for procuring timed movement of the gear train of the clock work D.

The spring 72 of clock work D is wound in the following manner: Arbor 73 has an extension 97 which projects outwardly beyond the plate 42. To this extension is rigidly secured, by means of a set screw 98, a spur pinion 99.

This pinion meshes with a rack 101, best shown in Figs. 3 to 8 inclusive. The rack 101 is held in mesh with the pinion 99 by means of a flanged roller 102 which is rotatably mounted on a stud 103 secured to the plate 42. The rack 101 is guided for translatory movement by means of the roller 102 and by means of a channel-shaped guide 104 secured to the plate 42. The guide 104 is constructed with spaced parallel flanges 105 between which a head 106 on the lower end of the rack 101 slides. The head 106 fits snugly between the flanges 105 and the rack proper is free from the said flanges so that a minimum amount of friction occurs. The head 106 has secured to it a pin 107 by means of which the rack is given motion to rotate gear 99 and wind the spring 72. When the clock work runs, rack 101 slowly moves upwardly. For the sake of reference I have termed such movement as the timed movement of said rack and the downward movement during which the clockwork is being wound as the reverse movement of said rack.

For the purpose of moving rack 101, I have provided a mechanism which I have termed an actuator and which includes the carriage 56. This mechanism is best shown in Fig. 1. Pivoted to the bread carriage 56 by means of a stud 108 is a lever 109. This lever is constructed with a handle 111 which projects outwardly through a slot 112 in the case 37. The lever 109 is provided with an inwardly turned portion 113 which is constructed with a finger 114, best shown in Figs. 3 to 8 inclusive. Finger 114 is adapted to engage the pin 107 when the lever 109 is swung inwardly into the position shown in full lines in Fig. 1. Formed in the lever 109 is a slot 115. A headed stud 116 passes through this slot and is secured to the bread carriage 56. This stud guides the lever 109 for swinging movement adjacent the bread carriage 56 and at the same time limits the extreme movement of the said lever. A spring 117 is attached to a pin 118 issuing from the stud 116 and to another pin 119, secured to lever 109. This spring urges the lever to its dotted line position shown in Fig. 1. The lever 109 is so designed that, when in its full line position, finger 114 is in a position to engage the pin 107 and when in its dotted line position the said finger will clear the pin to permit the clockwork to unwind without obstruction. It will readily be comprehended that, when the handle 111 of lever 109 is depressed, the same is first swung from its inoperative position to a position in which the finger 114 may engage the pin 107. As further pressure is applied to the handle 111, bread carriage 56 is moved downwardly and as soon as the finger 114 engages pin 107, rack 101 is lowered which rotates pinion 99 and winds the spring 72. Such winding is permitted through the ratchet mechanism 78, previously referred to, so that it becomes unnecessary to reverse the movement of the majority of the gears in the said clockwork. The ratchet mechanism 78 is preferably arranged on arbor 77 instead of arbor 73 so as to procure sufficiently accurate winding of the spring 72 which determines the length of time that the toaster will operate, as will be subsequently more fully described.

The timing mechanism C consists of a cam assembly 121 which includes a cam arm 122. Arm 122 is pivoted by means of a stud 123 to the plate 42. This arm extends generally lengthwise of the frame 36 and has formed on it at its lower end a laterally extending plate 124. Issuing outwardly from one side of the said arm is a flange 125 which has formed on it a cam 126 which is parallel to the plate 124 but spaced from it. The cam 126 has a cam surface 127. Cam arm 122 may be swung laterally on the stud 123 and the cam surface 127 is so constructed that the same approaches or recedes from the ends of the frame 36 when the arm 122 is so swung. Surface 127 of cam 126 is adapted to be engaged by a lug 128 which issues outwardly from the carriage 56. In the winding of the clockwork D, the carriage 56 is depressed and when the lug 128 engages the surface 127 of said cam winding movement of the clockwork is terminated. The carriage 56 is tripped at a fixed locality, as will be subsequently more fully described. It will therefore readily become comprehended that the time of toasting is determined by the downward movement of rack 101 which is controlled by the position of the arm 122 and cam 126 when lug 128 engages said cam. For this reason I have termed the cam 126 as the time measuring cam.

The arm 122 is formed with an extension 129 which has pivoted to it another cam arm 131. This is accomplished by means of a bolt 132 which extends jointly through said arms. Arm 131 is constructed with an off-set 133 and with an elongated cam 134 which serves to shift the arm 131 and vary the timing of the cam 126. This cam I have termed the time varying cam. This cam has a cam surface 135 which is adapted to be engaged by the pin 107 on rack 101. By means of a mechanism to be presently described cam 131 is caused to move in unison with arm 122. The cam surface 135 is so disposed that upward movement of the pin 107 causes cam 134 and likewise the arm 122 to swing toward the left, as viewed in Figs. 3 to 8. It will be comprehended that, if the toasting operation is commenced before the pin 107 reaches its uppermost position, one such position being shown in Fig. 8, the lug 128 when rack 101 is depressed will engage an intermediate portion of the cam surface 127 which will be intermediate the two extreme ends of said cam surface. It will also be seen that the degree of toasting can be varied by shifting the cam 134 laterally with respect to the arm 122.

The cam 134 travels in unison with the arm 122 but may be shifted manually with respect to said arm 122 to permit of varying the degree of toasting of the bread. This is accomplished as follows: Pivoted to the arm 131 by means of a bolt 136 is a lever 137 which is constructed with a finger piece 138. This lever has an arm 139 extending angularly therefrom which is adapted to engage a pin 141 fast on arm 122. A headed screw 142 passes through a slot 143 in the lever 137 and is secured to the offset portion 133 of arm 131. This screw guides the lever 137 for movement with reference to arm 131 and also limits the degree of movement of said lever. A spring washer 140 encircling the screw 142 provides friction between the said screw and the arm 137 thus holding the arm 139 in adjusted position relative to the cam 134. The arm 122 is urged to the right by means of a looped spring 144 which bears against the extension 129 of said arm and against the rod 47 which secures the plate 43 to the plate 42. The pin 141 forms a stop which limits relative movement of the cam 134 and the arm 122 toward one another. When the finger piece 138 is moved upwardly, cam 134 may be more closely positioned to the arm 122 than when said finger piece 138 is moved downwardly.

Figure 7:
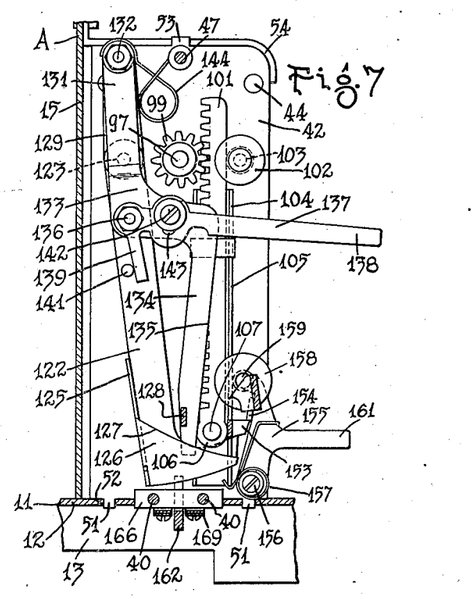
Fig. 7 is a view similar to Fig. 5 showing the parts in altered position.

The bread carriage 56 is held in its lowermost position by a mechanism best shown in Fig. 7. On the carriage 56 is formed a catch 153 which projects outwardly therefrom. This catch is adapted to engage a lug 154 formed on a swinging arm 155. Arm 155 is pivoted on a stud 156 which is secured to the plate 42. A spring 157, acting between the arm 155 and the guide 104, urges the arm 155 to swing toward the left and to bring the lug 154 into a position to be engaged by the catch 153. Movement of the arm 155 is limited by engagement of said arm with the guide 104. The arm 155 is provided with a roller 158 which is pivoted to a pintle 159 secured to said arm. This roller is so arranged as to lie in the path of movement of pin 107 on rack 101 and when engaged by said pin is moved outwardly an amount sufficient to disengage lug 154 from catch 153. The arm 155 is of such length and the roller 158 is so positioned that, when the lug 154 is disengaged the bread has been completely toasted. A finger piece 161 is formed on the arm 155 by means of which the same may be manually operated to release the bread carriage prior to the completion of the toasting operation.

In the operation of my invention it becomes necessary to lock the arm 122 in position, while the clock work D is being wound up and until the amount of winding of said clock work has been determined by lug 128 engaging cam surface 127. For this purpose a locking lever 162 is employed which is best shown in Figs. 2 and 11. This lever is formed with a short lever arm 163 and with a longer lever arm 164 which is bent, as indicated at 160 to cause the larger portion of said arm to lie parallel with the arm 163 and in spaced relation thereto. The lever 162 is pivoted by means of a pin 165 to the bar 166. This bar is slotted, as designated at 167, to receive the arm 163 and the pin 165 is so arranged that the extreme end 168 of the arm 163 lies in close proximity to the plate 124 on cam arm 122. A spring 169 acts between the bar 166 and the arm 164 of lever 162 in a manner to urge the end 168 into engagement with plate 42. In normal position the plate 124 is frictionally held against plate 42 and the arm 122 and cam 126 locked from movement.

For releasing the arm 122, a cam roller 171 is utilized which is pivoted to a stud 172 secured to the end of the arm 164 of lever 162. This cam roller is adapted to engage a cam 173, secured to the bread carriage 56. Cam 173 has an inclined cam surface 174 which, when engaging the roller 171, urges the arm 164 outwardly and releases the plate 124. The cam 173 is so situated that, when the bread carriage 56 is at its uppermost position, roller 171 is engaged thereby and the locking device operated to free the plate 124.

Figure 4:
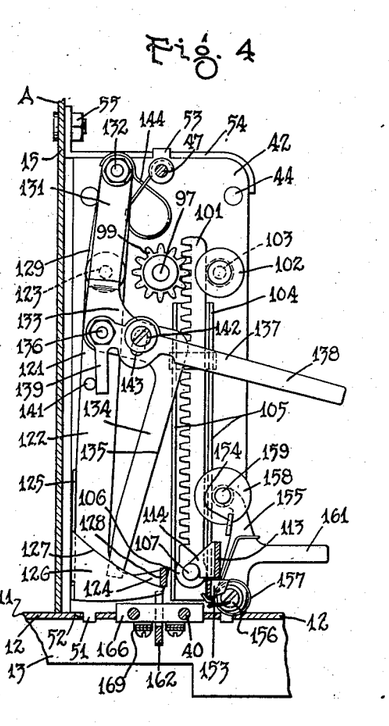
Fig. 4 is a view similar to Fig. 3 showing the device fully wound up with the handle still depressed.
Figure 5:
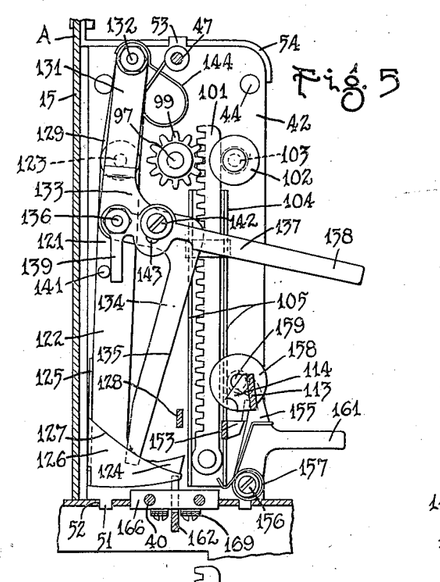
Fig. 5 is a view similar to Fig. 4 showing the handle released and the carriage latched.

The operation of the invention is as follows: In Fig. 3 the parts are shown when the clock work D is run down and when the toaster is out of use and relatively cold. In such position it will be noted that the pin 107 is at its uppermost position and engages the uppermost end of the cam surface 135 of the time varying cam 134. This causes arm 122 to be moved toward the left and permits lug 128 to engage the toe end of the cam 126 whereby a sufficiently great length of time is procured to toast bread with a cold toaster. In initiating operation of the toaster, handle 111 is pressed downwardly against the action of the spring 175. Upon initial movement of this handle, the lever 109 is swung from its position shown in dotted lines in Fig. 1 to its full line position in which swinging movement of said lever is arrested when the stud 116 reaches the end of slot 115. This brings the finger 114 into a position to engage the pin 107. Thereafter, as downward pressure is applied to handle 111 bread carriage 56 commences to travel downwardly against the action of spring 175. Upon initially moving bread carriage 56 cam 173 is disengaged from roller 171 and the plate 124 becomes locked, holding the cam arm 122 from movement and positioning the cam 126. As soon as finger 114 engages pin 107, the rack 101 travels downwardly and the teeth thereof meshing with the teeth of the pinion 99 cause the said pinion to rotate. This winds up the clock spring 72. During winding the ratchet mechanism 78 functions to permit of the winding of the said spring without causing operation of the entire gear train. As the bread carriage 56 approaches its lowermost position, catch 153 engages lug 154 and forces arm 155 outwardly. When the said catch passes below the lug, spring 157 urges arm 155 back to normal position. Movement of bread carriage 56 and rack 101 continues until the lug 128 engages a portion of the cam surface 127 of cam 126. This arrests movement of the bread carriage and rack and the clock work D has now been wound as far as permitted by the said cam 126. The relative positions of the parts at this stage of the operation of the invention are shown in Fig. 4. At the same time that the carriage 56 is lowered, projection 152 on said carriage engages the cam 151 of switch 146 and closes the said switch. The heating elements 35 are now energized. The rack 101 is temporarily held in its lowermost position by the ratchet mechanism 78. Upon release of the handle 111, the lever 109 is swung outwardly by the spring 117 and finger 114 is moved out of the path of travel of the pin 107. Carriage 56 now raises until the catch 153 engages the lug 154 and then comes to rest. The positions of the parts are now as shown in Fig. 5. As soon as pressure on the pin 107 is released, the spring 72 of the clock work D causes the gears of the gear train to rotate and the crank arm 89 causes alternate oscillations of the balance wheel 95. The clock work then operates in the normal manner and spring 72 unwinds at a predetermined rate of speed. As the said spring unwinds, rack 101 slowly raises and pin 107 travels with it. After the lapse of a length of time suitable for toasting the bread carried by the bread rack 61, pin 107 engages the cam roller 158 and swings the arm 155 outwardly. This disengages lug 154 from catch 153 and the bread carriage 56 is now freed and is rapidly returned upwardly through the action of the spring 175. Through such movement the toast is raised through the openings 38 in case 37 and is accessible for removal. Immediately upon reaching the uppermost position cam 173 of bread carriage 56 engages the cam roller 171 and swings arm 164 outwardly thereby moving the end 168 of arm 163 away from plate 42 and freeing the plate 124. Upon being freed spring 144 moves the cam assembly 121 in a counter-clockwise direction shifting cam 126 to the right so that the heel end of cam surface 127 is in the path of movement of lug 128. At this time the pin 107 is in a position to engage the cam surface 135 of the time varying cam 134. After completion of the toasting operation the clock work D continues to operate and during its subsequent operation pin 107 continues to rise and during such movement swings the cam 134 gradually to the left. Concurrently, cam arm 122 moves to the left and the cam 126 is gradually shifted so that the toe end of the same is moved toward the position to be engaged by the lug 128.

Figure 6:
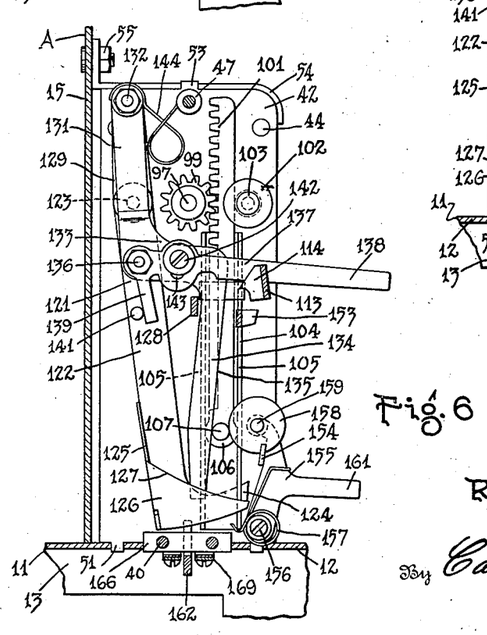
Fig. 6 is a view similar to Fig. 5 showing the carriage released.

Upon completion of the first toasting operation, as brought out, the cam 173 engages cam roller 171 and frees the plate 124. Spring 144 then acts upon cam arm 122 and forces the same to move to its extreme right hand position, as shown in Fig. 6. If, at this time, a second slice of bread is inserted into the toaster and the handle 111 again depressed, lug 128 would engage the cam surface 127 of cam 126 somewhere near the heel end thereof and the amount of winding of the clock work D would be considerably less than the amount the clock work was initially wound. A short period of toasting would thereupon be procured when the pin 107 operated cam roller 158 to terminate the toasting period.

Figure 8:
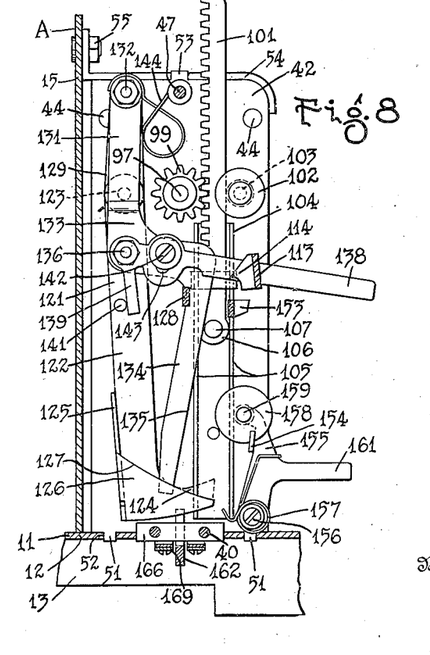
Fig. 8 is a view similar to Fig. 5 showing the arrangement of the parts after the lapse of a predetermined length of time following the completion of a toasting cycle.

In Fig. 7 I have shown the arrangement of the parts after the toaster has been fully wound up, where the same was immediately used upon completion of the first toasting operation. In this figure it will be noted that the cam arm 122 is considerably toward the right as shown in Fig. 5. If, however, a certain amount of time is allowed to elapse before the second slice of bread is inserted in the toaster, pin 107 moves upwardly beyond its position shown in Fig. 6 and during such movement shifts the cam assembly 121 toward the left. The cam 134 and the clock work D are so designed that, when the pin 107 reaches the uppermost portion of the cam surface 135, the toaster is sufficiently cool so that the same amount of time is required to toast the next following slice of bread as when the toaster has been in disuse for a considerable length of time. If a slice of bread is inserted in the toaster before pin 107 reaches its uppermot position, the cam arm 122 would be in an intermediate position and the lug 128 would engage the cam surface 127 at a portion of the same intermediate the ends thereof. This cam is designed so that, regardless of the amount of time which elapses following each toasting operation, a sufficient length of time is given in the succeeding toasting operation to properly toast the bread. In Fig. 8 I have shown the pin 107 at an intermediate position and the cam 126 in the corresponding position. It will thus be seen that properly toasted bread will be procured regardless of the condition of the toaster and regardless of the length of the time intervals between toasting operations.

The advantages of my invention are manifest. By means of the construction shown, uniformity of brownness of the toast can be procured without the use of thermostatic devices. With my invention there are no delicately operable parts to get out of adjustment. My invention is highly practical and highly serviceable in operation.

Changes in the specific form of my invention, as herein disclosed, may be made within the scope of what is claimed without departing from the spirit of my invention.

Having described my invention, what I claim as new and desire to protect by Letters Patent is:

1. In combination, a movable member, movable in opposite directions, driving means for imparting to said movable member timed movement in one direction, said movable member being adapted to commence timed movement at any of a number of positions upon termination of its movement in the opposite direction, adjustable means for terminating movement of said movable member in the latter direction and at any of a number of said positions, and movable means moved by said movable member for moving said adjustable means to procure variation in the duration of the period of movement of said movable member in said first mentioned direction.

2. In a periodically operable food cooking device, heated during cooking and cooling after cooking, said device being re-usable before complete cooling, a movable member movable in opposite directions, means for imparting to said movable member timed movement in one direction, means for initiating the cooking period and moving the movable member in the opposite direction, means operable by said movable member at an intermediate position for terminating the cooking period, movable means for varying the duration of the cooking period and means operated by said movable member following the termination of the cooking period for moving said movable means to vary the duration of the cooking period.

3. In a periodically operable food cooking device heated during cooking and cooling after cooking, said device being re-usable before complete cooling, a movable member movable in opposite directions, motive means for imparting to said movable member timed movement in one direction, an actuator engaging a part movable with said movable member for moving said movable member in the opposite direction, said actuator initiating a cooking period, said actuator being adapted to initiate timed movement of said movable member by said motive means at any of a number of different positions of said movable member upon disengagement from said part, adjustable means for limiting the movement of said movable member, means operable by the movable member at an intermediate position for terminating the cooking period, and means operated by said movable member following the termination of the cooking period for adjusting said adjustable means to vary the duration of the following cooking period.

4. In a periodically operable food cooking device, heated during cooking and cooling after cooking, said device being re-usable before complete cooling, a movable member movable in opposite directions, means for imparting to said movable member timed movement in one direction, means for initiating the cooking period and moving the movable member in the opposite direction, means operable by said movable member at an intermediate position for terminating the cooking period, said means for imparting timed movement to the movable member becoming actuated upon termination of movement of the movable member at any of a number of positions, a movable abutment adapted to limit the movement of said movable member and to vary the duration of the following cooking period thereof, and means operated by said movable member after termination of the cooking period for moving said abutment.

5. In a periodically operable food cooking device, heated during cooking and cooling after cooking, said device being re-usable before complete cooling, a movable member movable in opposite directions, means for imparting to said movable member timed movement in one direction, means for initiating the cooking period and moving the movable member in the opposite direction, means operable by said movable member at an intermediate position for terminating the cooking period, said means for imparting timed movement to the movable member becoming actuated upon termination of movement of the movable member at any of a number of positions, a movable cam adapted to limit movement of said movable member and to vary the duration of the following cooking period, and a cam operated by said movable member after termination of the cooking period for moving the first cam.

6. In a periodically operable food cooking device, heated during cooking and cooling after cooking, said device being re-usable before complete cooling, a movable member movable in opposite directions over a predetermined path, a restrainable driving member adapted upon release to impart to said movable member timed movement in one direction, said movable member when moved in the opposite direction restraining operation of said driving member, an actuator movable with said movable member for moving the same in said opposite direction and for initiating a cooking period, said actuator upon reversal of movement releasing said driving member, a cam for terminating movement of said movable member, means on said actuator adapted to engage said cam, said cam being movable to vary the position at which movement of said actuator is terminated, means operated by said movable member when at an intermediate position for terminating the cooking period, means controlled by said movable member during travel over a portion of its path following said position for shifting said cam to determine the subsequent limit at which movement of said actuator is terminated, and means for locking said cam from movement, said means being operated by said actuator when at its released position.

7. In a periodically operable food cooking device, heated during cooking and cooling after cooking, said device being re-usable before complete cooling, a movable member movable in opposite directions over a predetermined path, a restrainable driving member adapted upon release to impart to said movable member timed movement in one direction, said movable member when moved in the opposite direction restraining operation of said driving member, said movable member upon movement in the reverse direction releasing said driving member at various positions of said movable member, a cam movable to vary the position at which said driving member is released, means operated by said movable member when at an intermediate position for terminating the cooking period, and means controlled by said movable member during travel following said position for shifting said cam to determine the duration of the following cooking period.

8. In a periodically operable food cooking device, heated during cooking and cooling after cooking, said device being re-usable before complete cooling, a movable member movable in opposite directions over a predetermined path, a restrainable driving member adapted upon release to impart to said movable member timed movement in one direction, said movable member when moved in the opposite direction restraining operation of said driving member, said movable member upon movement in the second named direction being capable of releasing said driving member at various positions of said movable member, a cam movable to vary the position at which said driving member is released, means operated by said movable member when at an intermediate position for terminating the cooking period, a second cam movable with said first cam and means movable with said movable member and engaging said second cam for shifting the position of the first cam.

9. In a periodically operable food cooking device, heated during cooking and cooling after cooking, said device being re-usable before complete cooling, a movable member movable in opposite directions, means for imparting to said movable member timed movement in one direction, means for initiating the cooking period and moving the movable member in the opposite direction, means operable by said movable member at an intermediate position for terminating the cooking period, a lug movable with said movable member, a movable cam for engagement with said lug, said cam limiting the movement of said movable member and determining the duration of the following period of the movable member, and means operated by the movable member after termination of the cooking period for moving the cam.

10. In a periodically operated food cooking device, heated during cooking and cooling after cooking, said device being re-usable before complete cooling, a reciprocable member movable in opposite directions, means for imparting to said reciprocable member timed movement in one direction, means for initiating the cooking period and moving the reciprocable member in the opposite direction, means operable by said movable member at an intermediate position thereof for terminating the cooking period, means for varying the duration of the cooking period and means operable by said movable member following the termination of the cooking period for moving said means to vary the duration of the following cooking period.

11. In a periodically operated food cooking device, heated during cooking and cooling after cooking, said device being re-usable before complete cooling, a rack movable in opposite directions, a spring energized clockwork having a pinion meshing with said rack, said rack upon movement in one direction winding the clockwork, the degree of winding depending upon the final position of the rack, said clockwork imparting to the rack timed movement in the other direction upon termination of the winding thereof, an actuator for moving said rack to wind the clockwork and initiate the cooking period, a movable abutment for limiting the movement of said rack in the winding of the clockwork to vary the timed movement of the rack by the clockwork, means operable by said rack at an intermediate position thereof for terminating the cooking period and means operable by said rack after termination of the cooking period for moving the abutment to vary the duration of the following cooking period.

12. In a periodically operated food cooking device, heated during cooking and cooling after cooking, said device being re-usable before complete cooling, a rack movable in opposite directions, a spring energized clockwork having a pinion meshing with said rack, said rack upon movement in one direction winding the clockwork, the degree of winding depending upon the final position of the rack, said clockwork imparting to the rack timed movement in the other direction upon termination of the winding thereof, an actuator for moving said rack to wind the clockwork and initiate the cooking period, a pivoted lever, a cam on said lever, means movable with said rack for engaging the cam to limit the movement of the rack in winding the clockwork, means operable by the rack at an intermediate position thereof for terminating the cooking period, a second cam carried by said lever and means movable with said rack for engaging said second cam after termination of the cooking period to swing the lever and shift the position of the first cam to vary the degree of winding of the clockwork for the following cooking period.

13. In a periodically operated food cooking device, heated during cooking and cooling after cooking, said device being re-usable before complete cooling, a rack movable in opposite directions, a spring energized clockwork having a pinion meshing with said rack, said rack upon movement in one direction winding the clockwork, the degree of winding depending upon the final position of the rack, said clockwork imparting to the rack timed movement in the other direction upon termination of the winding thereof, an actuator for moving said rack to wind the clockwork and initiate the cooking period, a pivoted lever, a cam on said lever, means movable with said rack for engaging the cam to limit the movement of the rack in winding the clockwork, means operable by the rack at an intermediate position thereof for terminating the cooking period, a second cam carried by said lever, means movable with said rack for engaging said second cam after termination of the cooking period to swing the lever and shift the position of the first cam to vary the degree of winding of the clockwork for the following cooking period and means for locking the position of said lever during winding movement of said clockwork.

14. In a periodically operated food cooking device, heated during cooking and cooling after cooking, said device being re-usable before complete cooling, a rack movable in opposite directions, a spring energized clockwork having a pinion meshing with said rack, said rack upon movement in one direction winding the clockwork, the degree of winding depending upon the final position of the rack, said clockwork imparting to the rack timed movement in the other direction upon termination of the winding thereof, an actuator for moving said rack to wind the clockwork and initiate the cooking period, a pivoted lever, a cam on said lever, means movable with said rack for engaging the cam to limit the movement of the rack in winding the clockwork, means operable by the rack at an intermediate position thereof for terminating the cooking period, an arm pivoted to said lever, a second cam carried by said arm, manual means for adjusting the position of said arm relative to said lever to alter the relative position of said cams and means movable with said rack for engaging said second cam after termination of the cooking period to swing the lever and shift the position of the first cam to vary the degree of winding of the clockwork for the following cooking period.

15. In combination, a periodically movable time controlled movable member movable for variable distances over a predetermined path, means for varying the length of said distance of travel and time varying means including a movable part moved by said movable member during travel of said movable member over a portion of its path for adjusting said means to vary the distance traveled by said movable member during the following period of said movable member.

16. In combination, a movable member movable in opposite directions, a restrainable driving member adapted upon release to impart to said movable member timed movement in one direction, said movable member when moved in the opposite direction restraining operation of said driving member, an actuator movable with said movable member for moving the same in reverse direction and for initiating a cooking period, said actuator upon reversal of movement releasing said driving mechanism, a cam for terminating movement of said movable member, means on said actuator adapted to engage said cam, said cam being movable to vary the position at which movement of said actuator is terminated, means controlled by said movable member during travel over a portion of its path following said position, for shifting said cam to determine the subsequent limit at which movement of said actuator is terminated, and means for locking said cam from movement, said means being operated by said actuator when at its released position.

17. In a periodically operated food cooking device, heated during cooking and cooling after cooking, said device being re-usable before complete cooling, a rack movable in opposite directions, a spring energized clockwork having a pinion meshing with said rack, said rack upon movement in one direction winding the clockwork, the degree of winding depending upon the final position of the rack, said clockwork imparting to the rack timed movement in the other direction upon termination of the winding thereof, an actuator movable from an initial to a final position, means on said actuator engaging and moving said rack to wind the clockwork and initiate the cooking period, a lever extending generally in the same direction as the direction of movement of the said rack, a cam carried by said lever, a lug on said actuator adapted to engage said cam to terminate movement of said rack when said actuator is moved to wind the clockwork, means carried by said actuator for terminating the cooking period, resilient means for returning said actuator to its initial position, a latch for latching said actuator in its final position, means carried by said rack and engaging said latch for freeing said actuator and terminating the cooking period and means operated by said rack subsequent to disengagement of said latching means for shifting the position of said cam.

18. In a periodically operable food cooking device heated during cooking and cooling after cooking, said device being usable before cooling, a movable member movable in opposite directions, means for imparting to said movable member timed movement in one direction, an actuator movable from an initial to a final position for moving said movable member in the opposite direction, said movable member upon actuation initiating a cooking period, a cam for terminating the movement of said movable member in the last named direction, a latch for latching said actuator in its final position, means carried by said movable member and engaging the latch for freeing the actuator and terminating the cooking period and means operated by said movable member subsequent to the disengagement of said latching means for shifting the position of said cam.

19. In a periodically operable food cooking device heated during cooking and cooling after cooking, said device being usable before cooling, a movable member movable in opposite directions, means for imparting to said movable member timed movement in one direction, an actuator movable from an initial to a final position, means on said actuator for moving said movable member in the opposite direction, said movable member upon actuation initiating a cooking period, a lever, a cam carried by said lever, a lug on said actuator adapted to engage said cam to terminate movement of said actuator, means carried by said actuator for terminating the cooking period, resilient means for returning said actuator to its initial position, a latch for latching said actuator in its final position, means carried by said movable member and engaging said latch for freeing said actuator for terminating the cooking period and means operated by said movable member subsequent to disengagement of said latch for shifting the position of said cam.

20. In a periodically operable food cooking device heated during cooking and cooling after cooking, said device being usable before cooling, a movable member movable in opposite directions, means for imparting to said movable member timed movement in one direction, an actuator movable from an initial to a final position, means on said actuator for moving said movable member in the opposite direction, said movable member upon actuation initiating a cooking period, a lever, a cam carried by said lever, a lug on said actuator adapted to engage said cam to terminate movement of said actuator, means carried by said actuator for terminating the cooking period, resilient means for returning said actuator to its initial position, a latch for latching said actuator in its final position, means carried by said movable member and engaging said latch for freeing said actuator for terminating the cooking period, means operated by said movable member subsequent to disengagement of said latch for shifting the position of said cam, a lock for holding said cam from movement and means operated by said actuator for rendering said lock inoperative when the actuator has been released by said latch, said means causing the cam to be locked when the actuator is moved away from initial position.

21. In combination, a single periodically operable time controlled movable member movable through consecutive odd numbered and even numbered periods and resettable after each even numbered period to begin movement through the next odd numbered period and being adapted to control the duration of operation of a device throughout the extent of the odd numbered periods, means for determining the duration of the odd numbered periods, and time varying means controlled by the length of the even numbered periods for adjusting the first named means to vary the duration of the following odd numbered period.

ROBERT SARDESON.